United States Patent

Leitz et al.

[11] Patent Number: 5,104,935
[45] Date of Patent: Apr. 14, 1992

[54] POLYMER MIXTURE

[75] Inventors: Edgar Leitz, Dormagen; Karl-Erwin Piejko, Bergisch-Gladbach; Christian Lindner, Cologne; Karl-Heinz Ott, Leverkusen; Hans-Eberhard Braese, Cologne, all of Fed. Rep. of Germany

[73] Assignee: Bayer Aktiengesellschaft, Leverkusen, Fed. Rep. of Germany

[21] Appl. No.: 447,300

[22] Filed: Dec. 6, 1989

[30] Foreign Application Priority Data

Dec. 10, 1988 [DE] Fed. Rep. of Germany ....... 3841669

[51] Int. Cl.$^5$ .................. C08F 283/02; C08F 265/02; C08F 236/00
[52] U.S. Cl. ........................ 525/67; 525/64; 525/455
[58] Field of Search ............. 525/64, 67, 455

[56] References Cited

U.S. PATENT DOCUMENTS

| | | | |
|---|---|---|---|
| 3,639,503 | 2/1972 | Matzner | 525/413 |
| 3,935,153 | 1/1976 | Kudo et al. | 525/64 |
| 4,388,443 | 6/1983 | Bourland | 525/67 |
| 4,393,172 | 7/1983 | Lindner et al. | 525/310 |
| 4,442,263 | 4/1984 | Brandstetter et al. | 525/83 |
| 4,511,695 | 4/1985 | Lindner et al. | 525/80 |
| 4,535,124 | 8/1985 | Binsack et al. | 525/67 |
| 4,619,971 | 10/1986 | Yates, III et al. | 525/64 |
| 4,959,410 | 9/1990 | Eichenauer et al. | 525/415 |

FOREIGN PATENT DOCUMENTS

| | | |
|---|---|---|
| 2940804 | 4/1981 | Fed. Rep. of Germany . |
| 3135251 | 3/1983 | Fed. Rep. of Germany . |
| 3808843 | 9/1989 | Fed. Rep. of Germany . |

Primary Examiner—John C. Bleutge
Assistant Examiner—W. R. H. Clark
Attorney, Agent, or Firm—Joseph C. Gil; Godfried R. Akorli

[57] ABSTRACT

Polymer mixtures of a. 10 to 60 parts by weight of a graft polymer,
b. 10 to 50 parts by weight of a partially cross-linked, rubber like copolymer of from 5 to 40% by weight of acrylonitrile, styrene, alkyl methacrylate or mixtures thereof and from 95 to 60% by weight of alkyl acrylate having a gel content of from 20 to 99% by weight,
c. 5 to 40 parts by weight of an uncross-linked polymer of styrenes, α-methyl styrenes, acrylonitrile, methacrylonitrile, esters of acrylic acid or methacrylic acid, vinyl $C_1$ to $C_4$ carboxylic acids or mixtures of these monomers having Staudinger Indices ($\eta$) (determined in dimethyl formamide at 23° C.) of from 0.3 to 1.5 dl/g and
d. 1 to 45 parts by weight of a polymer of a cyclic aliphatic ester or of an aliphatic cyclic ester and an aliphatic cyclic carbonate.

4 Claims, No Drawings

POLYMER MIXTURE

This invention relates to polymer mixtures which are suitable for the manufacture of flexible, age resistant sheet products with a leather like appearance and which can be worked up by calandering and deep drawing.

Plastics sheet products with a leather like appearance are used, for example, for the upholstery and trims of motor vehicles. They are generally produced by calandering a raw sheet followed by deep drawing. The plastic material used is in most cases polyvinyl chloride mixed with various vinyl polymers and plasticisers. These sheet products are not completely resistant to aging at high temperatures and contain volatile additives which have a tendency to migration as well as halogen from the polyvinyl chloride present. There is therefore a demand for a plastics material which contains no polyvinyl chloride (PVC) and is suitable for the manufacture of leather like sheet products.

The present invention relates to mixtures of a. 10 to 60 parts by weight, in particular 20 to 50 parts by weight of a graft polymer of
  a.1 mixtures of 20 to 40% by weight of acrylonitrile and 80 to 60% by weight of styrene, α-methyl styrene, alkyl methacrylate or mixtures thereof or
  a.2 methyl methacrylate optionally mixed with up to 30% by weight of styrene and/or alkyl acrylate and/or up to 19% by weight acrylonitrile grafted on
  a.3 a particulate highly cross-linked alkyl acrylate rubber which may contain up to 30% by weight of dienes incorporated by polymerisation and has an average particle diameter ($d_{50}$) of from 80 to 800 nm,
  the graft polymer (a) having rubber contents of from 30 to 80% by weight, preferably from 45 to 65% by weight, most preferably from 50 to 60% by weight, b. 10 to 50 parts by weight, in particular 10 to 40 parts by weight, of a partially cross-linked, rubber like copolymer of from 5 to 40% by weight of acrylonitrile, styrene, alkyl methacrylate or mixtures thereof and from 95 to 60% by weight of alkyl acrylate having a gel content of from 20 to 99% by weight, a swelling index greater than 10, determined in dimethyl formamide at 23° C., and an average particle diameter ($d_{50}$) of from 100 to 600 nm, in particular from 100 to 300 nm, c. 5 to 40 parts by weight, in particular 10 to 30 parts by weight of an uncross-linked polymer of styrenes, α-methyl styrenes, acrylonitrile, methacrylonitrile, esters of acrylic acid or methacrylic acid, vinyl $C_1$ to $C_4$ carboxylic acids or mixtures of these monomers having Staudinger Indices ($\eta$) (determined in dimethyl formamide at 23° C.) of from 0.3 to 1.5 dl/g and d. 1 to 45 parts by weight, preferred 5 to 40 parts by weight, most preferred 8 to 30 parts by weight, of a polymer of a cyclic aliphatic ester or a copolymer of a cyclic aliphatic ester and a cyclic aliphatic carbonate, the ratio by weight of ester to carbonate being from 98:2 to 40:60.

These polymer mixtures are suitable for the production of soft, easily stretchable sheet products by deep drawing, optionally with a leather like grain imparted by embossing.

The sheet products obtained are resistant to aging even at high temperatures. They require only small quantities of a small number of auxiliary agents (stabilizers, lubricants, mould release agents, etc.) for processing. The sheet products obtained from the polymer mixtures according to the invention adhere particularly firmly to other technical polymers, such as polyurethanes.

Moulding compounds of styrene/acrylonitrile copolymers and graft rubbers are known.

In DE-OS 3 129 472, for example, there are described moulding compounds of styrene/acrylonitrile copolymers and graft rubbers of acrylic acid esters as graft basis and styrene/acrylonitrile copolymers as graft shells. Styrene/acrylonitrile copolymers mixed with various graft rubbers based on polyburadiene and on acrylate/butadiene copolymers grafted in each case with styrene and acrylonitrile are described in DE-OS 3 135 251.

Moulding compounds of styrene/acrylonitrile copolymers and special graft rubbers having a multishell structure are described in DE-OS 3 006 804.

Mixtures of styrene/acrylonitrile copolymers and graft rubbers in addition containing ethylene/propylene co- and terpolymers are described in DE-OS 2 940 804. Styrene/butadiene block copolymers as additional components are described in DE-OS 3 605 375.

These moulding compounds are generally used for the production of moulded parts such as housings for domestic appliances. They are therefore rigid and not suitable for the production of leather substitutes which are required to be very supple.

When attempts are made to make the known moulding compounds softer by increasing the proportion of graft rubber, a material with an uncomfortable, rubber-like handle and poor deep drawing properties is obtained. This material is unsuitable for the production of sheet products for use as leather substitutes.

The graft polymers a. are generally emulsion polymers having a particulate structure. They consist of particulate alkyl acrylate rubbers with a gel content above 50% by weight and average particle diameters ($d_{50}$) of from 80 to 800 nm as graft basis on which monomers such as alkyl acrylates, alkyl methacrylates, α-methyl styrenes, styrenes, acrylonitrile or mixtures thereof are graft polymerised.

The alkyl acrylate rubbers are preferably prepared by a cross-linking copolymerisation of $C_2$ to $C_8$ alkyl acrylates and optionally up to 20% by weight of comonomers such as styrene, methyl methacrylate, vinylmethyl ethers and acrylonitrile and up to 4% by weight of polyfunctional vinyl and/or allyl monomers such as divinyl benzene, glycol-bis-acrylate, bis-acrylamide, triallyl phosphate, triallyl citrate, triallyl cyanurate, triallyl isocyanurate, allyl esters of acrylic acid or methacrylic acid or allyl esters of maleic acid; especially triallyl cyanurate or triallyl isocyanurate. The acrylate rubbers used as graft basis preferably have a bimodal distribution of the average particle diameter. They are therefore preferably mixtures of two particulate rubbers, one of which has an average particle diameter ($d_{50}$) of from 150 to 250 nm and the other an average particle diameter ($d_{50}$) of from 400 to 600 nm. The ratio by weight of finely divided to coarse rubber is from 1:2 to 2:1. A distribution curve of the average particle diameters of a mixture of the two rubbers, which may be identical or different in their chemical structure, therefore has two maxima.

Particularly suitable coarse particled rubbers have a core/shell structure, (see DE-OS 3 006 804).

Particularly preferred graft bases for the preparation of the graft polymers a. are thus mixtures of (larger) rubber particles having a core/shell structure and (smaller) rubber particles without a core/shell structure. The rubber particles used for graft polymerisation are preferably partially cross-linked and have gel contents of from 50 to 98% by weight. The graft polymers a. are prepared by graft polymerising vinyl monomers in emulsion on emulsions of the acrylate rubbers described above. These vinyl monomers are generally mixtures of from 20 to 40% by weight of acrylonitrile and from 80 to 60% by weight of styrene, α-methylstyrene, alkyl methacrylate or mixtures thereof or consist predominantly of methyl methacrylate to which up to 30% by weight of styrene and/or alkyl acrylate and/or up to 19% by weight of acrylonitrile may be added.

Styrene/acrylonitrile mixtures are preferred.

The graft polymers a. have a rubber content of from 30 to 80% by weight, preferably from 45 to 65% by weight, most preferably from 50 to 60% by weight.

The vinyl monomers are preferably graft polymerised with a graft yield above 40% by weight, i.e. a high proportion of the vinyl monomers is chemically bound to the rubber (by covalent bonds). Such high graft yields may be obtained by employing redox initiators in known manner, preferably combinations of hydroperoxide and ascorbic acid, optionally with the addition of heavy metal cations.

Copolymer b. is an at least partially cross-linked rubber like copolymer of (b.1): 5 to 40 parts by weight of acrylonitrile, styrene, $C_1$ to $C_6$ alkyl methacrylate (in particular $C_1$ to $C_3$ alkyl methacrylate) or mixtures thereof, in particular a copolymer of acrylonitrile and/or methyl methacrylate, and (b.2): 95 to 60 parts by weight of alkyl acrylate, in particular $C_3$ to $C_8$ alkyl acrylate, and 0.05 to 5% by weight, based on the sum of b.1+b.2, of a polyfunctional, copolymerisable polyvinyl or allyl compound, preferably triallyl cyanurate, triallyl isocyanurate, a vinyl ether of polyols, a vinyl or allyl ester of polyfunctional carboxylic acids and bisacrylamides of diamines; the polymers b. have gel contents of from 20 to 99% by weight, in particular above 40% by weight, a swelling index above 10, determined in dimethyl formamide at 23° C., and an average particle diameter ($d_{50}$) of from 100 to 600 nm, in particular from 100 to 300 nm.

The copolymers b. may be prepared in known manner by radical, aqueous emulsion polymerisation in the presence of anionic, surface active substances at 40° to 95° C., in particular at 55° to 80° C.

The uncross-linked polymers c. are resinous polymers or copolymers of styrenes, α-methyl styrenes, acrylonitrile, methacrylonitrile, esters of acrylic or methacrylic acid, vinyl $C_1$ to $C_4$ carboxylic acids or mixtures of these monomers and have Staudinger indices ($\eta$) as a measure of their molecular weight (determined in dimethyl formamide at 23° C.) of from 0.3 to 1.5 dl/g. They are preferably copolymers of styrene or α-methyl styrene and acrylonitrile optionally containing up to 40% by weight of esters of acrylic acid or methacrylic acid, in particular methyl methacrylate or butyl acrylate. The uncross-linked polymers c. are obtained by conventional processes such as radical polymerisation in solution, suspension or emulsion or solvent free, preferably by radical emulsion polymerisation in water.

Polymer d. is a polymer of a cyclic aliphatic ester corresponding to the formula (I)

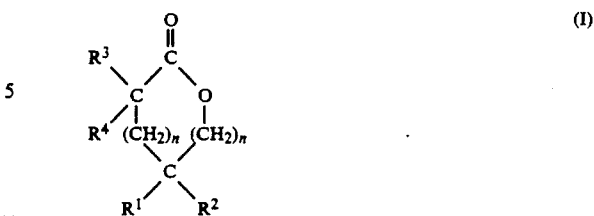

or a copolymer of a cyclic aliphatic ester corresponding to formula (I) and a cyclic aliphatic carbonate corresponding to formula (II)

In the above formulae, $R^1$, $R^2$, $R^3$ and $R^4$ in formula (I) denote, independently of one another, hydrogen, $C_1$ to $C_6$ alkyl, $C_1$ to $C_6$ alkoxy or $C_3$ to $C_6$ alkylene, preferably hydrogen, $CH_3$ or $C_2H_5$, and m and n in formula (I) denote, independently of one another, 0 or an integer from 1 to 6.

The preferred compound of formula (I) is ε-caprolactone.

$R^5$ in formula (II) may stand for one of the following groups:

| | |
|---|---|
| $-CH_2-CH_2CH(CH_3)-$ | a. |
| $-CH_2CH_2OCH_2CH_2OCH_2-CH_2-$ | b. |
| $-CH_2CH(CH)_3CH_2CH_2C(CH_3)_2CH_2-$ | c. |

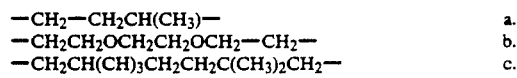

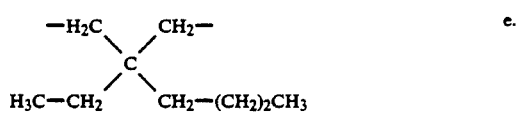

A preferred compound corresponding to formula (II) is neopentyl glycol carbonate.

The polymers corresponding to formula (I) are known and have been described, for example, in U.S. Pat. No. 3,021,313 and U.S. Pat. No. 2,890,208.

The polymers of formula (I) may have molecular weights of from 10,000 g/mol to 1,000,000 g/mol, preferably from 15,000 g/mol to 500,000 g/mol.

The copolymers of compounds of formulae (I) and (II) are known and their preparation is described in DE-OS 3 700 193.

They have a sequential structure represented by the idealized formula (III):

$$(A-X-B)_y \qquad (III)$$

wherein A is a polymer of a cyclic, aliphatic carbonate corresponding to formula (II), B is a polymer of a cyclic, aliphatic ester of formula (I), y stands for an integer of from 1 to 10, preferably from 1 to 5, most preferably 1, and X is a polymer containing both the cyclic, aliphatic carbonate (II) and the cyclic, aliphatic ester (I) in polymerised form, the concentration of the polymerised aliphatic carbonate (II) continuously decreasing in the direction towards block B and the concentration of the polymerised ester (I) continuously decreasing in the direction towards block A ("tapered structure").

The average molecular weight (weight average $\overline{M}_w$) of blocks A and B in formula (III) may be identical or different. The average molecular weight $\overline{M}_w$ of A are from 2000 to 500,000 g/mol, preferably from 5000 to 250,000, and those of B are from 2000 to 500,000 g/mol, preferably from 5000 to 250,000 g/mol.

The copolymers d. used according to the invention contain from 98 to 40% by weight, preferably from 95 to 50% by weight of cyclic aliphatic esters in polymerised form and from 60 to 2% by weight, preferably from 50 to 5% by weight, of cyclic, aliphatic carbonates in polymerised form.

Preparation of the copolymers is carried out by solution polymerisation in aprotic organic solvents, preferably at +20° C. to −30° C., using organic alkali metal compounds as initiators.

The polymer mixture according to the invention of a., b., c. and d. may be prepared, for example, as follows: If components a. to c. are obtained as aqueous dispersions, these may be mixed in the proportions of the desired solids content and worked up together, e.g. to a powder, which may be compressed to a granulate with the addition of conventional auxiliary substances.

Component d. is mixed with components a., b. and c. in conventional mixing apparatus such as screws, mixing rollers, kneaders or powder mixers.

Components a., b. and c. may also be worked up separately before being mixed with component d.

The gel contents and swelling indices were determined in dimethyl formamide at 23° C. unless otherwise indicated (see M. Hoffmann et al, Polymeranalytik II, Georg Thieme Verlag, Stuttgart, 1977). The particle diameters are average particle diameters ($d_{50}$) (see "Ultrazentrifungenmessungen", W. Scholtan et al., Kolloidz. u.Z. Polymere 250 (1972) 783-796).

EXAMPLES

Graft Polymer a

Preparation of the acrylate rubber (graft basis)

The following were introduced into a reactor:

17,232 parts by weight of water and 588 parts by weight of a polybutadiene rubber latex having a polymer solids content of 42% by weight and an average particle diameter ($d_{50}$) of 140 nm. After the contents of the reactor have been heated to 63° C., a solution of 49.2 parts by weight of potassium peroxy disulphate and 1152 parts by weight of water is added. The following mixtures are then introduced simultaneously into the reactor within 5 hours at 63° C.:

Solution 1:
36,000 parts by weight of n-butyl acrylate and
81.6 parts by weight of triallyl cyanurate
Solution 2:
40,800 parts by weight of water and
384 parts by weight of the sodium salt of $C_{14}$-$C_{18}$ alkyl sulphonic acid.

The mixture is then completely polymerised by heating to 63° C. for 4 hours. An emulsion having a polymer solids content of 37% by weight is obtained. The average latex particle diameter ($d_{50}$) is 480 nm. The polymer has a gel content of 93% by weight.

Preparation of the graft polymer 734 parts by weight of water and 4784 parts by weight of the latex of the acrylate rubber are introduced into a reactor. The reactor is flushed with nitrogen for 30 minutes and the contents are heated to 70° C. The following solution 1 is added with stirring:
Solution 1:
190 parts by weight of water,
6 parts by weight of potassium peroxy disulphate
3 parts by weight of sodium $C_{14}$-$C_{18}$ alkyl sulphonate.

Solutions 2 and 3 are then introduced simultaneously into the reactor within 5 hours at 70° C.
Solution 2:
850 parts by weight of styrene and
330 parts by weight of acrylonitrile.
Solution 3:
1500 parts by weight of water and
20 parts by weight of the sodium salt of $C_{14}$-$C_{18}$ alkyl sulphonic acid.

Polymerisation is carried to completion by heating at 70° C. for 4 hours. An emulsion having a polymer solids content of 35% by weight is obtained. The rubber content is 60% by weight.

Partially Cross-linked Copolymer b

Preparation of the acrylonitrile/n-butyl acrylate copolymer

A solution of 2.5 parts by weight of the sodium salt of $C_{14}$-$C_{18}$ alkyl sulphonic acids and 750 parts by weight of water is introduced into a reactor with stirring. After the solution has been heated to 70° C., 70 parts by weight of solution A (see below) are added and polymerisation is initiated by the addition of a solution of 3.5 parts by weight of potassium peroxy disulphate in 50 parts by weight of water. The remainder of solution A and solution B (see below) are introduced into the reactor at a uniform rate at 70° C. within 6 hours and polymerisation is then completed within 4 hours. A latex having a polymer solids content of 38% by weight, an average particle diameter ($d_{50}$) of 180 nm and a gel content (in dimethyl formamide at 23° C.) of 98% by weight is obtained.

Solution A:
1105 parts by weight of n-butyl acrylate,
7 parts by weight of triallyl cyanurate, and
474 parts by weight of acrylonitrile
Solution B:
30 parts by weight of sodium salt of $C_{14}$ to $C_{18}$ alkyl sulphonic acid and
1790 parts by weight of water.

Uncross-linked Polymer c

Preparation of the styrene/acrylonitrile copolymer

A solution of 6 parts by weight of disproportionated abietic acid and 4 parts by weight of 1N sodium hydroxide solution in 3080 parts by weight of water is introduced into a reactor, flushed with nitrogen and heated to 70° C. 200 parts by weight of solution A (see below) are added with stirring and polymerisation is initiated with the addition of a solution of 8 parts by weight of potassium peroxy disulphate in 200 parts by weight of water. The remainder of solution A and solution B (see below) are added uniformly into the reactor within 5 hours at 70° C.

Polymerisation is then completed by heating to 70° C. for 4 hours. An emulsion having a polymer solids content of 33% by weight is obtained. The isolated polymer has a Staudinger index ($\eta$) of 0.7 dl/g (in dimethyl formamide at 23° C.).

Solution A:
1944 parts by weight of styrene,
756 parts by weight of acrylonitrile and
2.6 parts by weight of tert.-dodecyl mercaptan.

Solution B:
54 parts by weight of disproportionated abietic acid,
40 parts by weight of 1N sodium hydroxide solution and
2050 parts by weight of water.

Polymer d

Component d.1

Preparation of poly-ε-caprolactone 10 ml of n-butyl lithium (2.5 molar solution in hexane) are introduced with stirring and under nitrogen into a solution of 1800 g of ε-caprolactone in 10 liters of toluene at 15° C. The polymerisation time is 60 minutes at this temperature. 100 ml of methanol/1 molar phosphoric acid (1:1) are then added to the reaction mixture. The polymer is precipitated in methanol, isolated by filtration, stabilized with 0.5% by weight of the phosphorous acid ester of bis-(2-hydroxy-3-cyclohexyl-5-methyl-phenyl)methane and 0.2% by weight of 2,6-ditert.-butyl-4-methyl phenol and dried.

Yield: 1615 g (89.7%), $\eta_{rel}$: 7.9 (determined on a 2% by weight solution in CH$_2$Cl$_2$ at 20° C.).

Component d.2

Poly-ε-caprolactone

Tone P 700, Union Carbide Corporation.

$\eta_{rel}$: 3.0 (determined on a 2% by weight solution in CH$_2$Cl$_2$ at 20° C.).

Component d.3

Preparation of a copolymer of ε-caprolactone and neopentyl glycol carbonate 20 ml of n-butyl lithium (2.5 molar solution in hexane) are added with stirring and under nitrogen to a solution of 1800 g of ε-caprolactone and 200 g of neopentyl glycol carbonate in 10 liters of toluene at 15° C. The polymerisation time is 60 minutes at this temperature. 100 ml of methanol/1 molar phosphoric acid (1:1) are then added to the reaction mixture. The polymer is precipitated in methanol, isolated by filtration and dried.

Yield: 1810 g (90.5%).

Composition according to 1H-NMR analysis:
neopentyl glycol carbonate: 9.9% by weight
ε-caprolactone: 90.1% by weight $\eta_{rel}$: 8.9 (determined on a 2% by weight solution in CH$_2$Cl$_2$ at 20° C.).

Preparation and properties of the polymer mixtures

The polymer mixtures are prepared by mixing the latices of components a., b. and c. in the proportions of their solids contents required to result in the compositions of the polymer mixtures shown in Table 1. 1% by weight (based on the solids content) of a phenolic stabilizer is added to the latex mixtures and the mixtures are coagulated with aqueous magnesium sulphate solution. The powders initially obtained are filtered off, washed and dried at 60° C. The powders are homogenised with component d. as shown in Table 1 and 0.4% by weight of ester wax on a mixing roller mill at 190° C. for 10 minutes and then compressed at 200° C. to form test samples. The properties of the test samples are listed in Table 2.

| Test methods: | |
|---|---|
| Tensile strength: | DIN 53 455 |
| Elongation: | DIN 53 455 |
| Tear propagation resistance: | DIN 53 515 |
| Shore hardness: | DIN 53 505/Type D |
| Vicat temperature: | Process A |
| Melt Index MFI: | DIN 53 735 |

Deep Drawing Test

A sheet produced on rollers (length 300 mm, width 300 mm, thickness 1 mm) is clamped into a deep drawing mould and heated to a surface temperature of 160° C. and 175° C., respectively (determination of the surface temperature by means of melting salt). A truncated cone is pressed into the sheet to a depth of 21 cm with application of a vacuum.

Assessment

+: A hollow body of uniform wall thickness conforming to the truncated cone is obtained at a surface temperature of 160° C. and 175° C.
−: The sheet tears.

Comparison of the resistance to aging of polymer mixtures 3.1–3.5 according to the invention with that of known deep drawing moulding compounds containing polyvinyl chloride.

Sheets of materials are stored at 130° C. and 150° C. for 21 days. The sheets containing polyvinyl chloride undergo discolouration varying from dark brown to black while the sheets according to the invention undergo virtually no colour change.

TABLE 1

Composition of the polymer mixtures.

| Experiment Number | Components (parts by weight) | | | | | |
|---|---|---|---|---|---|---|
| | a. | b. | c. | d$_1$ | d$_2$ | d$_3$ |
| 1 | 40 | 20 | 25 | 15 | — | — |
| 2 | 40 | 20 | 20 | — | — | 20 |
| 3 | 40 | 20 | 25 | — | — | 15 |
| 4 | 40 | 20 | 25 | — | 15 | — |
| 5 | 40 | 40 | 20 | — | 2.5 | — |
| 6 | 40 | 40 | 20 | — | 5 | — |
| 7 | 40 | 40 | 20 | — | 7.5 | — |
| 8 (comparison) | 40 | 40 | 20 | — | — | — |

TABLE 2

Properties of the mixtures from Table 1

| Experiment No. | Tensile strength (MPa) | Elongation (%) | Tear propagation resistance (N/mm$^2$) | Shore hardness (15") | Vicat (A) (°C.) | Response to deep drawing |
|---|---|---|---|---|---|---|
| 1 | 14.7 | 299 | 47 | 30 | 35 | + |
| 2 | 13.8 | 277 | 60 | 40 | 45 | + |
| 3 | 19 | 315 | 47 | 30 | 39 | + |

TABLE 2-continued

Properties of the mixtures from Table 1

| Experiment No. | Tensile strength (MPa) | Elongation (%) | Tear propagation resistance (N/mm$^2$) | Shore hardness (15") | Vicat (A) (°C.) | Responce to deep drawing |
|---|---|---|---|---|---|---|
| 4 | 12.5 | 276 | 43 | 24 | 32 | + |

TABLE 3

Properties of the mixtures from Table 1

| Experiment No. | Elongation [%] | Shore-hardness [15"] | MFI at 220° C. [g/10 min] |
|---|---|---|---|
| 5 | 231 | 40 | 1.93 |
| 6 | 258 | 40 | — |
| 7 | 271 | 37 | — |
| 8 (comparison) | 202 | 39 | 0.45 |

We claim:

1. Polymer mixtures of
   a. 10 to 60 parts by weight of a graft polymer of
      a.1 mixtures of from 20 to 40% by weight of acrylonitrile and from 80 to 60% by weight of styrene, α-methyl styrene, alkyl methacrylate or mixtures thereof or
      a.2 methyl methacrylate optionally mixed with up to 30% by weight of styrene and/or alkyl acrylate and/or up to 19% by weight of acrylonitrile grafted on
      a.3 a particulate, highly cross-linked alkyl acrylate rubber which may contain up to 30% by weight of dienes incorporated by polymerisation and has an average particle diameter (d$_{50}$) of from 80 to 800 nm, graft polymer a. having a rubber content of from 30 to 80% by weight,
   b. 10 to 50 parts by weight of a partially crosslinked, rubber like copolymer of from 5 to 40% by weight of acrylonitrile, styrene, alkyl methacrylate or mixtures thereof and from 95 to 60% by weight of alkyl acrylate having a gel content of from 20 to 99% by weight, a swelling index above 10 determined in dimethyl formamide at 23° C., and an average particle diameter (d$_{50}$) of from 100 to 600 nm,
   c. 5 to 40 parts by weight of an uncross-linked polymer of styrenes, α-methyl styrenes, acrylonitrile, methacrylonitrile, esters of acrylic acid or methacrylic acid, vinyl C$_1$ to C$_4$ carboxylic acids or mixtures of these monomers, having Staudinger indices (η) (determined in dimethyl formamide at 23° C.) of from 0.3 to 1.5 dl/g and
   d. 1 to 45 parts by weight of a polymer of a cyclic aliphatic ester or of an aliphatic cyclic ester and an aliphatic cyclic carbonate.

2. Polymer mixtures according to claim 1, in which component d is poly-ε-caprolactone.

3. Polymer mixtures according to claim 1, in which component d is a copolymer of ε-caprolactone and neopentyl glycol carbonate, the ratio by weight of ε-caprolactone to neopentyl glycol carbonate being from 98:2 to 40:60.

4. A flexible sheet product which can be deep drawn made of the polymer mixture according to claim 1.

* * * * *